United States Patent [19]
Ecklund

[11] Patent Number: 5,971,354
[45] Date of Patent: Oct. 26, 1999

[54] TAMPER RESISTANT FAUCET HANDLE

[76] Inventor: Mark D. Ecklund, 5705 Gordon St., Schofield, Wis. 54476-2540

[21] Appl. No.: 09/157,870
[22] Filed: Sep. 21, 1998
[51] Int. Cl.$^6$ .................................................. F16K 35/00
[52] U.S. Cl. ........................................... 251/104; 251/110
[58] Field of Search .............................. 251/93, 102, 104, 251/110

[56] References Cited

U.S. PATENT DOCUMENTS

| | | | |
|---|---|---|---|
| 359,714 | 3/1887 | Deming | 251/101 |
| 557,943 | 4/1896 | Bayley et al. | 251/110 |
| 643,617 | 2/1900 | Anderson | 251/110 |
| 685,612 | 10/1901 | Jakobson | 251/110 |
| 1,018,350 | 2/1912 | Bédard | 251/110 |
| 1,602,270 | 10/1926 | Kern | 251/104 |
| 3,384,339 | 5/1968 | Cornell, III | 251/291 |
| 3,672,392 | 6/1972 | Anderson | 137/288 |
| 3,891,005 | 6/1975 | Manoogian et al. | 137/625.17 |
| 3,915,195 | 10/1975 | Manoogian et al. | 137/625.41 |
| 4,089,347 | 5/1978 | Christo | 137/625.41 |
| 4,203,572 | 5/1980 | Coffman | 251/104 X |
| 4,708,172 | 11/1987 | Riis | 137/625.17 |
| 5,082,023 | 1/1992 | D'Alayer de Costemore d'Arc | 137/636.3 |
| 5,116,018 | 5/1992 | Friemoth et al. | 251/110 X |
| 5,363,880 | 11/1994 | Hsieh | 137/625.17 |
| 5,671,904 | 9/1997 | Minutillo | 251/96 |

Primary Examiner—Robert M. Fetsuga
Attorney, Agent, or Firm—Andrus, Sceales, Starke & Sawall

[57] ABSTRACT

A tamper resistant faucet handle is provided for locking conventional sink or bath faucets in a closed or partially closed position. The tamper resistant faucet handle includes a handle body mounted to the flow control lever and a movable interference plunger that is slidably located within a plunger bore contained in the handle body. A locking mechanism locks the interference plunger in either an inward position or an outward position. When the interference plunger is locked in the outward position, it resides partially beyond the surface of the handle body for a distance sufficient for the plunger to interfere with movement of the handle body and consequently the flow control lever. In this manner, the locked plunger limits the range of movement of the flow control lever to lock the faucet in a closed or semi-closed position. The locking mechanism can be released and the plunger returned to the inward position, thus re-establishing a full range of movement for the handle and the flow control lever. An embodiment of the invention is disclosed for use on single control faucets, and another embodiment is disclosed for use on dual control faucets. The locking mechanism requires two-handed coordination, and is therefore childproof. The locking mechanism for both embodiments preferably includes an actuation button that can be removed to prevent unauthorized use of the faucet by children or adults.

23 Claims, 3 Drawing Sheets

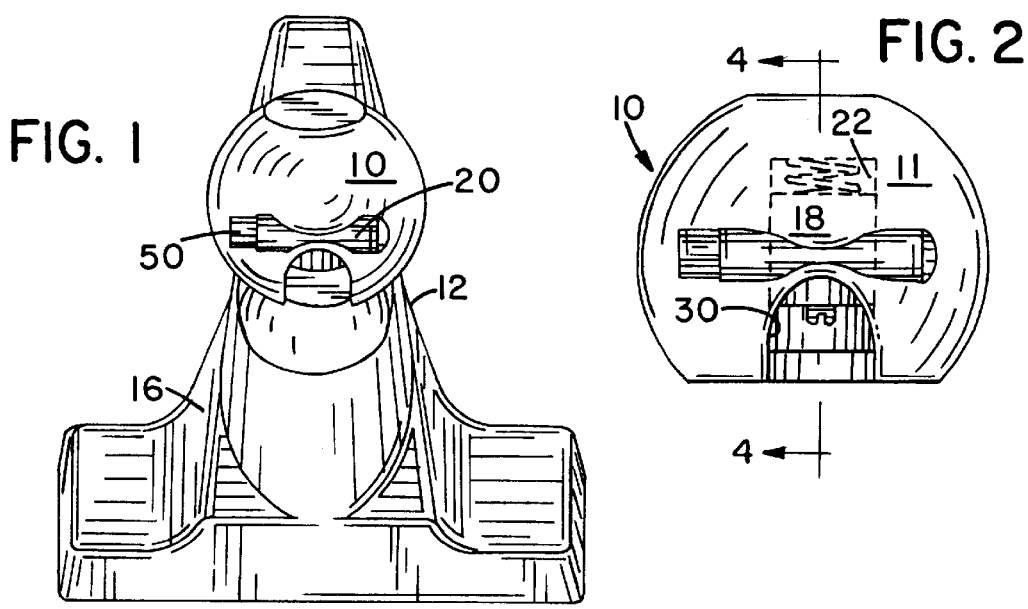
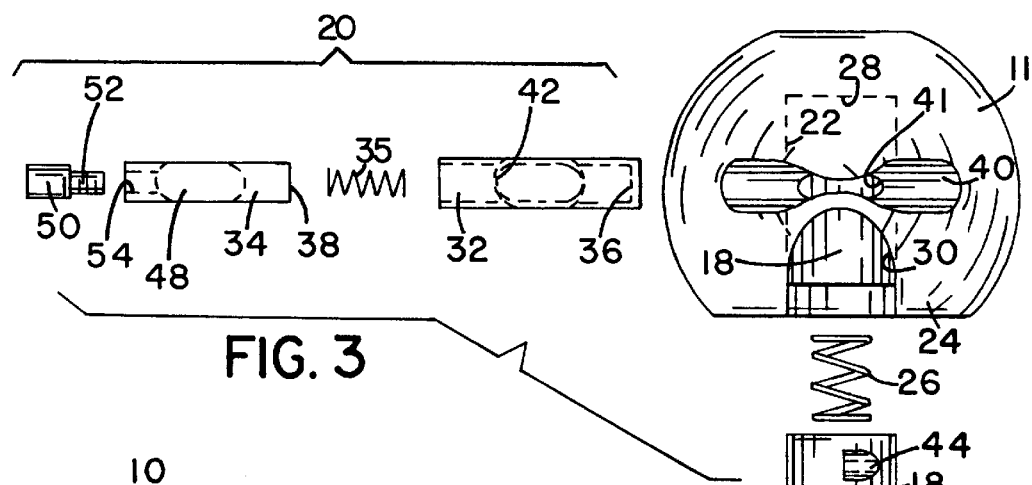
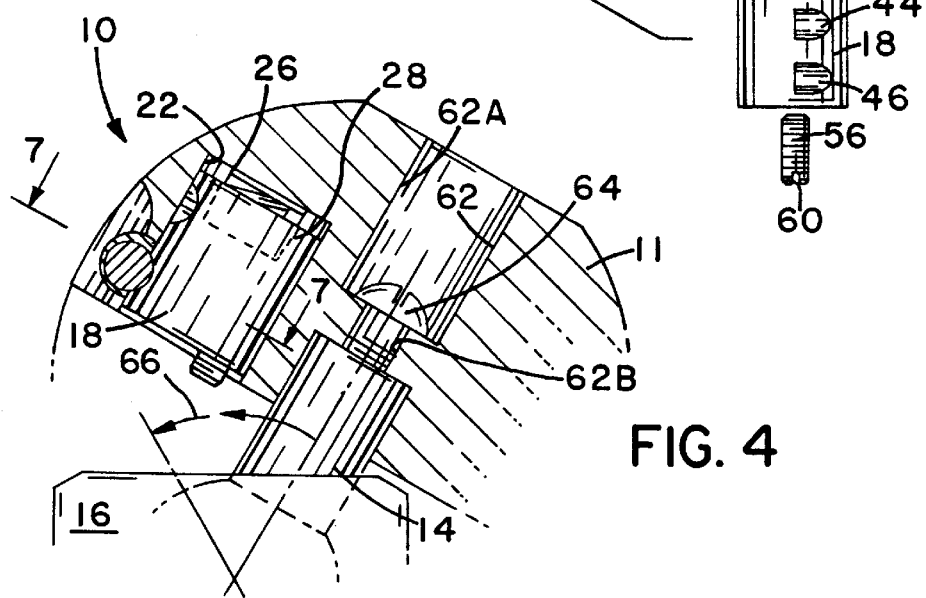

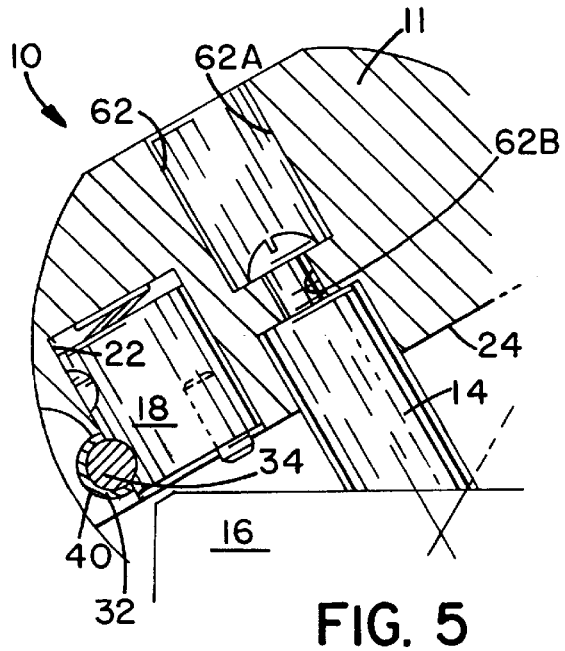
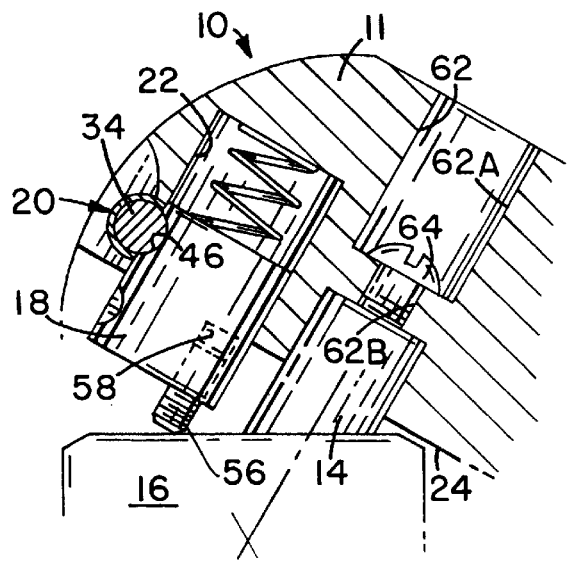
FIG. 5    FIG. 6
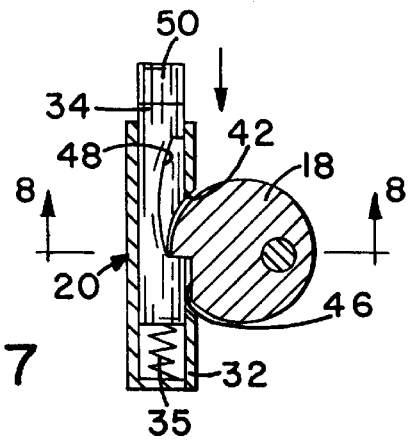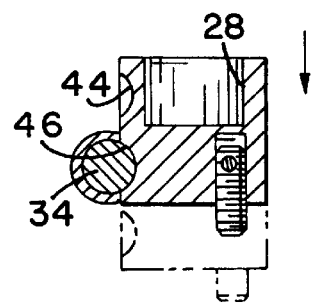
FIG. 7    FIG. 8
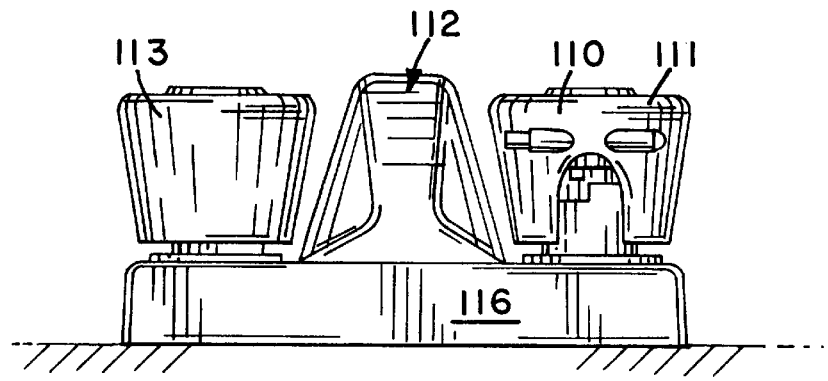
FIG. 9

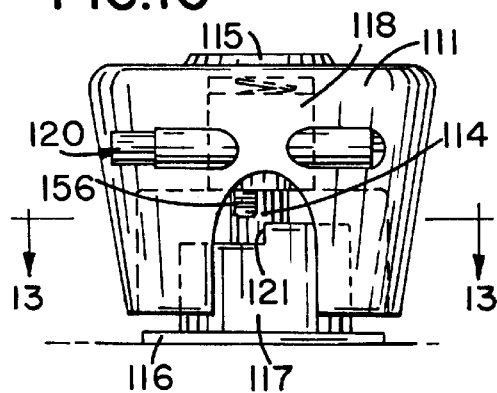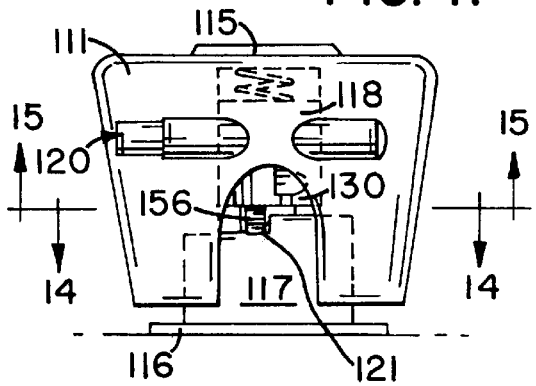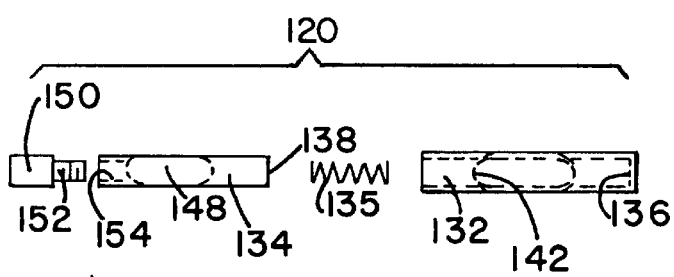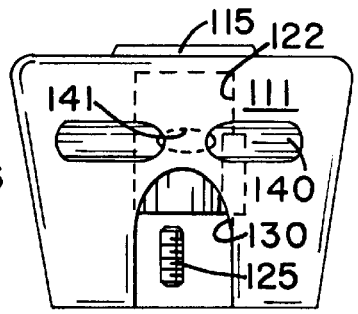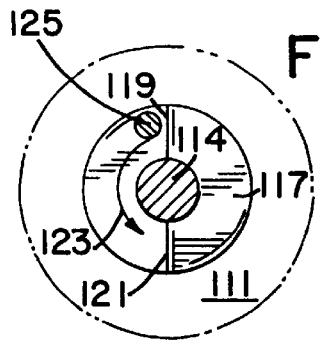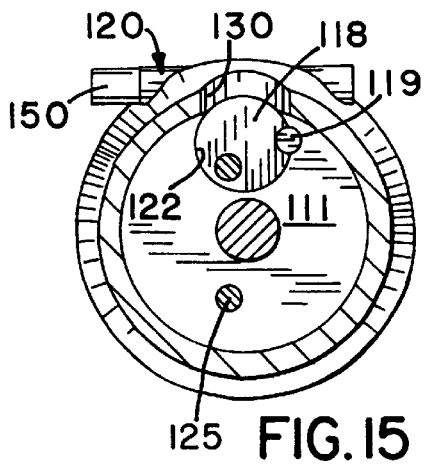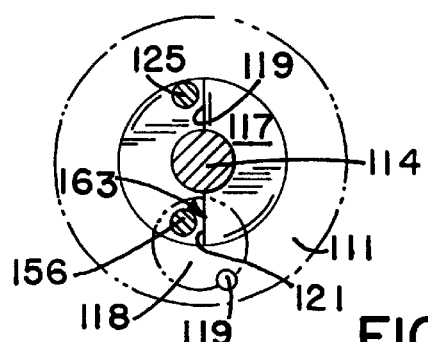

TAMPER RESISTANT FAUCET HANDLE

FIELD OF THE INVENTION

The invention is a tamper resistant faucet handle for locking conventional sink and bath faucets in a closed or semi-closed position. The invention is useful for preventing unauthorized use of a faucet, and is especially well-suited for protecting unsupervised children from scalding by hot water.

BACKGROUND OF THE INVENTION

It is sometimes desirable to lock faucet handles in a closed or semi-closed position to prevent unauthorized use of the faucet. For example, a practical childproof locking mechanism that prevents tampering with faucets appears to be an important first step for reducing scalding injuries in children. To date, however, no practical locking means have been made available to the public for conventional bath or sink faucets.

The invention is a tamper resistant faucet handle having a childproof locking mechanism that is practical, durable and easy to install on conventional sink and bath faucets. The tamper resistant faucet handle can be used to retrofit existing faucets, or can be used as an original part in new faucets. The tamper resistant faucet handle not only provides childproofing, but in its preferred embodiment also provides means for eliminating unauthorized use by adults as well.

In conventional sink and/or bath faucets, a faucet handle is mounted to a flow control lever normally by a screw. The flow of water through the faucet is controlled proportionately in response to the position of the flow control lever. There are basically two types of faucets in prominent use. The first type is dual control faucets which have separate, rotatable flow control levers or stems for hot and cold water. The other type is single control faucets in which the flow of hot and cold water through the faucet is selected in response to the tilting and rotating of the flow control lever relative to a faucet base. One embodiment of the invention is designed for use on single control faucets, whereas another embodiment of the invention is designed for use on dual control faucets.

A tamper resistant faucet handle in accordance with the invention includes a handle body mounted to the flow control lever and a movable interference plunger that is located at least partially within a plunger bore contained in the handle body. The interference plunger slides relative to the handle body within the plunger bore. In use, the interference plunger is slid outward beyond the surface of the handle body, and locked in the outward position. When locked in the outward position, the plunger extends beyond the surface of the handle body for a distance sufficient for the plunger to interfere with movement of the handle body and, consequently, the flow control lever. The interference by the locked plunger limits the range of movement of the flow control lever to lock the faucet handle in a closed or semi-closed position. In most cases, it is desirable to design the tamper resistant faucet handle such that the faucet is locked in a fully closed position when the interference plunger is locked in the outward position.

The interference plunger preferably contains two locking mechanism engagement depressions that interact with a locking mechanism to lock the interference plunger in the outward position or an inward position, respectively. When the plunger is locked in the inward position, the full range of movement is available for the flow control lever. The preferred locking mechanism includes a generally cylindrical outer sleeve mounted within a bore on the handle body. The sleeve has an end wall, longitudinal guide walls, and an opening in the longitudinal guide walls in the vicinity where the locking mechanism interacts with the interference plunger. The locking mechanism also has an elongated locking body that slides within the outer sleeve. The locking body is exposed to the interference plunger through the opening in the outer sleeve, and an opening in the handle body. A spring is located between the end wall of the outer sleeve and the locking body. The spring biases the sliding locking body in a locking position in which the sliding locking body engages one of the locking mechanism engagement depressions on the interference plunger to lock the plunger in position (i.e. the inward position or the outward position). The sliding locking body has a clearance depression for the interference plunger. To unlock the interference plunger, the user slides the locking body in the outer sleeve against the biasing pressure of the spring to align the clearance depression with the interference plunger, thereby releasing the locking mechanism and allowing the interference plunger to slide within the plunger bore in the handle body. The interference plunger is then moved to the other position (e.g. the outward position or the inward position) and locked into position by releasing the sliding locking body.

In its preferred form, the sliding locking body includes a removable actuation button opposite the end adjacent the spring within the outer sleeve. The actuation button is preferably attached to the sliding locking body via screw threads. The removable actuation button is exposed outside of the outer sleeve. To release the lock, the user presses on the actuation button to move the locking body against the biasing force of the spring to align the clearance depression on the locking body with the plunger. The removable actuation button can be unscrewed from the end of the locking body to disable the lock release mechanism either temporarily or permanently. When the actuation button is removed, the user cannot press the sliding locking body against the spring biasing force, and therefore the locking mechanism cannot be released. This feature prevents unauthorized use by children and adults.

The tamper resistant faucet handle preferably includes a compression spring to bias the interference plunger to the outward position. The interference plunger is returned to the inward position by pressing against the interference plunger. Both the embodiments of the invention preferably include an interference boss that extends outward from the outer surface of the interference plunger. In the embodiment of the invention for use on single control faucets, it is preferred that the distance the interference boss extends from the plunger surface be adjustable. This feature is important so that the tamper resistant faucet handle can be easily adjusted to accommodate faucet configurations having different dimensions. More specifically, when the interference plunger is locked in the outward position on a single control faucet, the interference boss extending from the plunger is designed to engage the faucet base. The engagement of the boss against the faucet base prevents rearward tilting of the faucet handle and, consequently, rearward tilting of the flow control lever. Preferably, the interference boss has self-locking threads that engage mating threads on the outer surface of the interference plunger, thus providing a practical means for rendering the boss repositionable. The distance from the faucet handle to the faucet base varies among commercially available single control faucets. Therefore, a repositionable interference boss on the plunger surface, with self-locking threads, is important for convenient use of the invention when retrofitting existing single control faucets.

In dual control faucets having separate controls for hot and cold water, the invention is used primarily to lock hot water faucets in a closed or partially closed position, although the invention may be used in the same fashion to lock cold water faucets in a closed or partially closed position. In dual control faucets, the range of movement of the flow control lever is merely rotational. In most dual control faucets, the rotatable flow control lever is surrounded by a stepped, flow control, stop member that is located at the base of the rotatable lever. The stepped, flow control stop member contains an operating space disposed between a first step and a second step on the member. A conventional handle body for a dual control faucet includes a flow control boss that extends from a surface of the handle body and resides in the operating space between the first step and the second step of the flow control stop member. The rotational range of movement of the flow control lever is defined by the range of movement of the flow control boss in the operating space between the first step and the second step of the flow control stop member. A tamper resistant faucet handle for a dual control faucet would normally include a conventional flow control boss. For dual control faucets, the interference plunger, and more particularly the interference boss, limits the range of movement of the flow control lever when the plunger is locked in the outward position by engaging the second step of the stepped, flow control stop member. In other words, the faucet is in the fully closed position when the conventional flow control boss engages the first step of the flow control stop member; and the faucet is in a fully open position when the conventional flow control boss engages the second step of the flow control stop member. In the preferred embodiment of the invention, the placement of the interference boss on the plunger is selected with respect to the position of the conventional flow control boss such that the conventional flow control boss will be engaging the first step (i.e., the OFF position), and the interference boss on the plunger will be engaging the second step (i.e., the faucet will be in the fully closed position when the interference plunger is locked in the outward position). The position of the interference boss relative to the conventional flow control boss is preferably selected to provide some clearance between the interference boss and the second step of the flow control stop member when the movable interference plunger is locked in the outward position and the conventional flow control boss is engaged against the first step of the flow control stop member.

The handle body is made of stainless steel, brass, injection molded plastic, or any other material conventionally used to fabricate faucet handles. It is preferred, however, that the other components of the tamper resistant faucet handle be made of brass, stainless steel, or some other durable, corrosion-resistant material.

From the foregoing description of the invention and the following drawings, it should be apparent to those skilled in the art that the invention embodies the following features and advantages:

1. a tamper resistant faucet handle in accordance with the invention is easy to install;
2. it is easy for adults to operate, yet requires knowledge and two-handed coordination usually absent in young children;
3. the release mechanism for the lock can be easily deactivated for all users on a temporary or permanent basis by removing the removable actuation button on the sliding locking body; and
4. the construction of the tamper resistant faucet handle is inexpensive and durable.

Other features and advantages of the invention may be apparent to those skilled in the art upon inspecting the following drawings and description thereof.

BRIEF DESCRIPTION OF THE DRAWINGS

FIG. 1 is a perspective view of a tamper resistant faucet handle in accordance with a first embodiment of the invention that is installed on a single control faucet.

FIG. 2 is an elevational view of the tamper resistant faucet handle in accordance with the first embodiment of the invention showing internal parts in phantom.

FIG. 3 is an exploded view of the tamper resistant faucet handle in accordance with the first embodiment of the invention.

FIGS. 4 and 5 are schematic views of the first embodiment of the invention in which the interference plunger is locked in an inward position and the handle and flow control levers are able to move throughout the full range of movement.

FIG. 6 is a schematic view of the first embodiment of the invention in which the interference plunger is locked in the outward position thereby locking the faucet in a fully closed position.

FIG. 7 is a detailed view taken along line 7—7 in FIG. 4.

FIG. 8 is a detailed view taken along line 8—8 in FIG. 7.

FIG. 9 is a perspective view of a tamper resistant faucet handle in accordance with a second embodiment of the invention that is installed on a dual control faucet.

FIGS. 10 and 11 are schematic views illustrating the operation of a tamper resistant faucet handle in accordance with the second embodiment of the invention.

FIG. 12 is an exploded view of a tamper resistant faucet handle in accordance with the second embodiment of the invention.

FIG. 13 is a schematic sectional view taken along line 13—13 in FIG. 10.

FIG. 14 is a schematic sectional view taken along line 14—14 in FIG. 11.

FIG. 15 is a sectional view taken along line 15—15 in FIG. 11.

DETAILED DESCRIPTION OF THE INVENTION

FIGS. 1–8 illustrate a tamper resistant faucet handle 10 in accordance with a first embodiment of the invention. The tamper resistant faucet handle 10 shown in FIGS. 1–8 is installed on a single control faucet 12 in which the range of movement of the flow control lever 14 involves both tilting with respect to the faucet base 16 and rotating of the flow control lever 14. The tamper resistant faucet handle 10 includes a handle body 11 that is especially designed to accommodate an interference plunger 18 and a locking mechanism 20 which render the faucet handle 10 tamper resistant.

The handle body 11 includes a cylindrical plunger bore 22 that extends inward from a bottom surface 24 of the handle body 11. An interference plunger 18 is located at least partially within the plunger bore 22, and is able to slide inward and outward along the plunger bore 22. A compression spring 26 is located between an end wall 28 of the plunger bore 22 and the interference plunger 18. The plunger 18 preferably includes a spring containment bore 28 to maintain proper alignment of the compression spring 26 within the bore 22. The purpose of the compression spring is to bias the interference plunger 18 in an outward position, FIG. 6, when the position of the plunger is not locked. The handle body 11 is provided with a finger access opening 30 adjacent the bottom portion of the plunger bore 22 to allow a user to push the plunger against the spring 26 to an inward position, FIGS. 4 and 5. The interference plunger 18 is able to be locked at an inward position, FIG. 5, in which the plunger 18 does not interfere with the range of movement of the flow control lever 14; and also in an outward position, FIG. 6, in which the interference plunger 18 interferes with movement of the handle body 11, and consequently the movement of the flow control lever 14 to lock the faucet 10 in a closed position.

The locking mechanism 20 includes an outer sleeve 32, an elongated locking body 34 which is slidably mounted within the outer sleeve 32, and a spring 35 located between an end wall 36 of the outer sleeve and an end 38 of the sliding locking body 34. The outer sleeve 32 is preferably press-fit within a locking mechanism bore 40 on the handle body 11. The handle body 11 has an opening 41 between the locking mechanism bore 40 and the plunger bore 22 which allows interaction between the locking mechanism 20 and the interference plunger 18. The outer sleeve 32 of the locking mechanism 20 is preferably cylindrical, and includes an opening 42. Referring to FIG. 7, the opening 42 in the outer sleeve 32 allows the elongated locking body 34 to interact with the interference plunger 18 through opening 41 in the handle body 11. The interference plunger 18 has two locking mechanism engagement depressions 44, 46. The locking body 34 engages depression 44 on the interference plunger 18 to lock the interference plunger in the outward position, FIG. 6. The locking body 34 engages depression 46 to lock the interference plunger 18 in the inward position, FIGS. 4 and 5. FIGS. 7 and 8 show the locking body 34 engaging depression 46 on the plunger 18 to lock the plunger 18 in the inward position.

The locking body 34 includes a clearance depression 48. To release the locking mechanism 20, the slidable locking body 34 is pushed against the bias force of spring 35 to align the clearance depression 48 with the interference plunger 18 through openings 41 and 42. With the locking mechanism 20 released, the interference plunger 18 is pushed to the outward position by compression spring 26, or the user can push the interference plunger into the inward position against the biasing force of spring 26 with their fingers through access opening 30.

The locking body 34 preferably includes a removable actuation button 50. The removable actuation button 50 is exposed outside of the outer sleeve 32. The button 50 provides means for the user to move the locking body 34 against the biasing force of the spring 35 to align the clearance depression 48 on the locking body 34 with the plunger 18 and release the lock. By removing the actuation button 50, an unauthorized user is not able to push the locking body 34 a sufficient distance to align the clearance depression 48 and release the lock. The removable actuation button 50 preferably includes threads 52 which are removably engaged in mating threads 54 on the locking body 34. The removable actuation button 50 can be removed when the interference plunger 18 is locked in the inward position, FIGS. 4 and 5, or in the outward position, FIG. 6. Removing the actuation button 50 when the plunger 18 is locked in the inward position, FIGS. 4 and 5, disables the tamper resistant features of the handle 10. Removing the actuation button 50 when the plunger 18 is locked in the outward position, FIG. 6, prevents unauthorized use by children and adults.

The plunger 18 includes an interference boss 56. The interference boss 56 is preferably a threaded shaft with self-locking threads. The interference boss 56 is repositionable and mounts into a threaded opening 58, FIG. 6, extending inward from the bottom surface 24 of the plunger 18. A slot 60 is provided on the interference boss 56 so that the height of the interference boss 56 can be easily adjusted with a screwdriver. Although implementation of the invention does not necessarily require the use of the repositionable interference boss 56, this feature can be important for implementing the invention as a retrofit on faucets having somewhat different configurations and/or dimensions. As mentioned, the distance from the faucet handle body 11 to the faucet base 16 can vary depending on the faucet configuration, and the use of a repositionable interference boss 56 provides a practical means of filling the tamper resistant handle 10 to the particular faucet.

The handle body 11 can be made from most materials in which conventional faucet handles are fabricated, for example, injection molded plastic, brass, stainless steel, etc. On the other hand, it is important that the interference plunger 18, spring 26, and the components of the locking mechanism 20 be durable and corrosion resistant. Therefore, it is preferable that these components be made of brass or stainless steel.

As shown in FIGS. 4–6, the handle body 11 contains a screw access bore 62 through its top surface. The screw access bore 62 includes a wide portion 62a and a narrow portion 62b. The wide portion 62a of the screw access bore 62 provides clearance for the head of attachment screw 64. The handle body 11 is secured to the control lever 14 by tightening screw 64 onto the control lever 14 with the head of screw 64 pressing tightly against the step between the narrow portion 62b and the wide portion 62a of the screw access bore 62 in the handle body 11.

The operation of the tamper resistant handle 10 on a single control faucet 12 is illustrated best in FIGS. 4, 5 and 6. In FIGS. 4 and 5, the plunger 18 is locked in an inward position, and therefore the faucet handle body 11 has a full range of movement. In FIG. 4, the handle body 11 is in a fully closed or OFF position, and consequently, the flow control lever 14 is in a fully closed or OFF position. However, because the interference plunger 18 is locked in an inward position, the user is able to move the handle body 11, and consequently the flow control lever 14, in the direction of arrows 66, FIG. 4. Movement of the handle body 11 in the direction of arrow 66 turns the faucet on or partially on. FIG. 5 shows the handle body 11 in a fully open position. Note that the plunger 18 is locked in the inward position in FIG. 5 so that the interference plunger 18 does not interfere with the faucet base 16, thus allowing the flow control lever 14 its full range of movement.

FIG. 6 shows the handle body 11 and flow control lever 14 locked in the fully closed or OFF position. In FIG. 6, the interference plunger 18 is locked in the outward position by engaging the locking body 34 of the locking mechanism 20 in depression 46 on the interference plunger 18. When the interference plunger 18 is locked in the outward position, FIG. 6, the plunger 18 extends outward from the plunger bore 22 beyond the surface 24 of the handle body 11 for a distance sufficient for the plunger 18 to interfere with movement of the flow control lever 14. More specifically, the repositionable interference boss 56 on the bottom of the interference plunger 18 engages the faucet base 16 to prevent movement of the faucet handle 11 from the fully closed or OFF position. As mentioned, the actuation button 50, FIG. 7, can be removed to disable the release mechanism for the lock.

FIGS. 9–15 relate to a second embodiment of the invention which is especially well-suited for use on dual control faucets 112. In FIG. 9, faucet handle 113 controls cold water flow, and tamper resistant faucet handle 110 controls hot water flow. In many respects, the embodiment of the invention shown in FIGS. 9–15 is similar to the embodiment shown in FIGS. 1–8, however, there are differences in the configuration due largely to the differences in operating characteristics between dual control faucets and single control faucets.

In dual control faucets, the handle body 111 is attached to a rotatable flow control lever 114, FIG. 10. The rotatable flow control lever 114 does not tilt with respect to the faucet base 1 16. Although it is not specifically shown in FIGS. 9–15, the handle body 111 for tamper resistant faucet handle 110 is connected to the rotatable flow control lever 114 preferably by a screw such as described in conjunction with FIGS. 4–6 above. A cap 115 is preferably mounted over the screw access hole as is conventional in the art.

Conventional dual control faucets have a stepped, flow control stop member 117 surrounding the base of the rotatable flow control lever 114. The stepped, flow control stop member 117 includes a first step 119, and a second step 121. An operating space 123 is disposed between the first step 119 and the second step 121, see FIG. 13. Conventional dual control faucet handles, as well as the tamper resistant faucet handle 110, include a flow control boss 125 that extends downward from the handle body 111 and resides within the operating space 123 of the stepped, flow control stop member 117. The range of movement of the flow control lever 114 is defined by rotation of the handle and the consequential movement of the flow control boss 125 between the first step 119 and the second step 121. When the flow control boss 125 is adjacent the first step 119, the flow control lever 114 is in a fully closed or OFF position; whereas, the flow control lever 114 is rotated to a fully open position when the flow control boss 125 is adjacent the second step 121. The tamper resistant faucet handle 110 for dual control faucet 112 limits the rotational range of movement when engaged.

As mentioned, the mechanical components of the embodiment of the invention 110 for a dual control faucet 112 as shown in FIGS. 9–15 are similar in many respects to that for single control faucets 12 as shown in FIGS. 1–8. For example, the interference plunger 118 includes a pair of locking mechanism engagement depressions 144, 146 and is slidably located within a plunger bore 122 in the handle body 111. A compression spring 126 biases the plunger 118 in an outward position when the plunger 118 is not locked into position. The plunger 118 for the dual control faucet 112, however, must be prevented from rotating within the plunger bore 122. Therefore, the cross-section of the plunger 118 is not completely circular, see FIG. 15. More specifically, a key 119 is provided at the interface between the handle body 111 and the plunger body 118 to prevent the plunger 118 from rotating within the plunger bore 122. As in the single control faucet 12, an opening 141 is provided between the plunger bore 122 and the locking mechanism bore 140 so that the locking mechanism 120 can interact with the plunger 118. The preferred locking mechanism 120 for the dual control faucet embodiment shown in FIGS. 9–15 is virtually identical to that shown for the single control faucet in FIGS. 1–8. Briefly, the outer sleeve 132 is press-fit into the locking mechanism bore 140 so that the opening 142 in the outer sleeve 132 aligns with opening 141 in the handle body 111. The spring 135 and the locking body 134 with the removable actuation button 150 are then placed within the outer sleeve 132. The locking body 134 engages plunger depression 144 to lock the plunger in the outward position, and engages plunger depression 146 to lock the plunger in the inward position. To release the lock, the actuation button 150 on the locking body 134 is pressed by the user against the bias force of spring 135 to align the clearance depression 148 in the locking body 134.

FIG. 10 shows the plunger 118 locked in an inward position. In FIG. 10, the interference boss 156 on the plunger 118 is raised above the height of step 121, and therefore the handle 111 is allowed its full range of movement. FIG. 13 is a cross-section taken along line 13—13 in FIG. 10 and illustrates that the flow control lever 114 has a complete range of movement when the plunger 118 is locked in the inward position. In FIG. 11, the plunger 118 is locked in the outward position, and the interference boss 156 prevents rotation of the handle 111 in the counter-clockwise direction because of interference with step 121.

FIG. 14 shows a cross-section taken along line 14-14 in FIG. 11, when the plunger 118 is locked in the outward position. When the plunger 118 is locked in the outward position, the conventional flow control boss 125 is adjacent the first step 119, whereas the interference boss 156 on the plunger 118 is adjacent the second step 121 thereby limiting rotation of the flow control lever 114. Preferably, there is a small clearance 163 between the second step 121 and the interference boss 156 when the plunger 118 is locked in the outward position and the flow control boss 125 is adjacent the first step 119. The clearance 163 is desirable to facilitate dependable downward engagement of the plunger 118 into the outward position.

It should be recognized that the invention has been described herein in accordance with two preferred embodiments of the invention, however, the invention should not be limited to the specific embodiments herein. Rather, various alternatives, embodiments and modifications may be apparent to those skilled in the art, and such alternatives or modifications should be considered to fall within the scope of the following claims.

I claim:

1. In a faucet having a flow control lever that proportionately controls flow of liquid through the faucet in response to the position of the flow control lever and a handle mounted on the flow control lever to enable the positioning of the flow control lever by a faucet user, the flow control lever having a range of movement including a first portion and a second portion, wherein the faucet includes a tamper resistant faucet handle comprising:

a handle body mounted to the flow control lever to facilitate movement of the flow control lever throughout the range of movement, the handle body including a plunger bore that extends inward from a surface of the handle body; and a movable interference plunger located at least partially within the plunger bore so that the interference plunger is able to slide outward from the plunger bore beyond the surface of the handle body, wherein the interference plunger can be locked in an outward position when the flow control lever is positioned in the first portion of the range of movement such that the plunger extends outward from the plunger bore beyond the surface of the handle body for a distance sufficient for the plunger to interfere with the movement of the handle body and consequently interfere with the movement of the flow control lever from the first portion of the range of movement into the second portion of the range of movement.

2. A tamper resistant faucet handle as recited in claim 1 wherein the interference plunger is able to be locked in an inward position such that the interference plunger does not limit the movement of the handle body or the movement of the flow control lever.

3. A tamper resistant faucet handle as recited in claim 1 further comprising a locking mechanism that interacts with the interference plunger to lock the interference plunger in the outward position.

4. A tamper resistant faucet handle as recited in claim 3 wherein:
the interference plunger is able to be locked in an inward position such that the interference plunger does not limit the movement of the handle body or the movement of the flow control lever; and,
the locking mechanism is able to interact with the interference plunger to lock the interference plunger in the inward position.

5. A tamper resistant faucet handle as recited in claim 3 wherein the interference plunger contains one or more locking mechanism engagement depressions and the locking mechanism comprises:
an outer sleeve mounted within a locking mechanism bore in the handle body, the outer sleeve having an end wall, longitudinal guide walls, and an opening in the longitudinal guide walls in the vicinity where the locking mechanism interacts with the interference plunger;
an elongated locking body slidably mounted at least partially within the outer sleeve, the locking body having a clearance depression for the interference plunger therein; and
a locking mechanism spring located between the end wall of the outer sleeve and an end of the elongated locking body;
wherein the locking mechanism spring biases the elongated locking body in a locking position such that the elongated locking body engages one of the respective one or more locking mechanism engagement depressions in the interference plunger to lock the position of the interference plunger, and the elongated locking body is able to be slid in the outer sleeve by the faucet user against the biasing force of the locking mechanism spring such that the clearance depression in the elongated locking body aligns with the interference plunger and allows the interference plunger to slide within the plunger bore in the handle body.

6. A tamper resistant faucet handle as recited in claim 5 wherein:
the interference plunger contains two locking mechanism engagement depressions, a first locking mechanism engagement depression being located on the interference plunger in a location to lock the interference plunger in the inward position, and a second locking mechanism engagement depression being located on the interference plunger in a location to lock the interference plunger in the outward position.

7. A tamper resistant faucet handle as recited in claim 5 wherein the locking mechanism further comprises a removable actuation button that is removably mounted to an end of the elongated locking body that is located opposite the end of the locking body engaging the locking mechanism spring.

8. A tamper resistant faucet handle as recited in claim 7 wherein the removable actuation piece has threads that engage mating threads on the locking body.

9. A tamper resistant faucet handle as recited in claim 5 wherein the outer sleeve, the locking body, and the interference plunger are made of a corrosion resistant metal.

10. A tamper resistant faucet handle as recited in claim 5 wherein the longitudinal guide walls of the outer sleeve are a generally cylindrical shell with the recited opening therein.

11. A tamper resistant faucet handle as recited in claim 1 further comprising a plunger compression spring located between the handle body and the interference plunger for pushing the interference plunger into the outward position when the position of the interference plunger is not locked.

12. A tamper resistant faucet handle as recited in claim 11 wherein the interference plunger includes a spring containment bore in which the plunger compression spring resides at least in part.

13. A tamper resistant faucet handle as recited in claim 5 wherein the elongated locking body includes a spring containment bore in which the locking mechanism spring resides at least in part.

14. A tamper resistant faucet handle as recited in claim 1 further comprising an adjustable interference boss that is mounted to the movable interference plunger, the interference boss being repositionable with respect to the movable interference plunger.

15. A tamper resistant faucet handle as recited in claim 14 wherein the adjustable interference boss has self-locking threads that engage mating threads on the interference plunger.

16. A tamper resistant faucet handle as recited in claim 1 wherein the handle body of the tamper resistant faucet handle has a screw hole therein and the tamper resistant faucet handle is attached to the flow control lever by a screw that passes through the screw hole in the handle body and secures the handle body to the flow control lever.

17. The invention as recited in claim 1 wherein:
the faucet is a single control faucet in which the range of movement of the flow control lever involves tilting and rotating the flow control lever relative to a faucet base; and
the interference plunger limits the range of movement of the handle body and consequently the flow control lever by engaging the faucet base when the interference plunger is locked into the outward position.

18. The tamper resistant faucet handle recited in claim 17 wherein the first portion of the range of movement of the flow control lever is an OFF portion and the second portion of the range of movement of the flow control lever is an ON portion.

19. The invention as recited in claim 1 wherein:
the range of movement of the flow control lever controlling flow of water through the faucet involves rotating the flow control lever about a central axis of the lever;
the faucet contains a faucet base including a stepped, flow control stop member adjacent the flow control lever, the stepped, flow control stop member having an operating space disposed in between a first step and a second step on the flow control stop member;
the handle body includes a flow control boss that depends from the surface of the handle body and resides in the operating space between the first stop and the second stop of the flow control stop member, the movement of the flow control boss within the operating space defining the range of movement of the flow control lever; and
the interference plunger limits the range of movement of the flow control lever by engaging the second step of the flow control stop member when the interference plunger is locked in the outward position.

20. A tamper resistant faucet handle as recited in claim 19 wherein the interference plunger includes a plunger interference boss that is mounted to the movable interference plunger, said interference boss engaging the second step of the flow control stop member to limit the range of movement of the flow control lever when the interference plunger is locked in the outward position.

21. A tamper resistant faucet handle as recited in claim 19 wherein the first portion of the range of movement is an OFF portion and the second portion of the range of movement is an ON portion.

22. A tamper resistant faucet handle as recited in claim 20 wherein a cross-section of the plunger bore has a non-circular shape and the interference plunger does not rotate within the plunger bore.

23. A tamper resistant faucet handle as recited in claim 21 wherein a clearance gap is provided between the plunger interference boss and the second step of the stepped, flow control stop member when the movable interference plunger is located in the outward position and the flow control boss is engaged against the first step of the stepped, flow control stop member.

* * * * *